United States Patent
Maciejczyk

(10) Patent No.: US 10,843,598 B2
(45) Date of Patent: Nov. 24, 2020

(54) CHILD SAFETY SEAT

(71) Applicant: BRITAX CHILDCARE PTY LTD., Port Melbourne (AU)

(72) Inventor: Wieslaw Maciejczyk, Port Melbourne (AU)

(73) Assignee: BRITAX CHILDCARE PTY LTD., Port Melbourne (AU)

( * ) Notice: Subject to any disclaimer, the term of this patent is extended or adjusted under 35 U.S.C. 154(b) by 0 days.

(21) Appl. No.: 16/375,997

(22) Filed: Apr. 5, 2019

(65) Prior Publication Data

US 2019/0308529 A1 Oct. 10, 2019

(30) Foreign Application Priority Data

Apr. 5, 2018 (AU) .................................. 2018901125

(51) Int. Cl.
*B60N 2/28* (2006.01)

(52) U.S. Cl.
CPC .... *B60N 2/2812* (2013.01); *B60N 2002/2818* (2013.01)

(58) Field of Classification Search
CPC .......... B60N 2002/2818; B60N 2/2812; B60N 2/2803; B60N 2/28; B60N 2/26
USPC ................. 297/256.15, 250.1, 256.1, 256.16
See application file for complete search history.

(56) References Cited

U.S. PATENT DOCUMENTS

| 5,299,855 | A  | * | 4/1994 | Zubeck | B60N 2/2812 |
|||||| 297/467 |
| 6,588,849 | B2 |   | 6/2003 | Glover et al. | |
| 8,256,840 | B2 | * | 9/2012 | Dasent | B60N 2/2806 |
|||||| 297/253 |
| 8,434,827 | B2 | * | 5/2013 | Young | A47D 15/006 |
|||||| 297/250.1 |
| 8,752,895 | B2 |   | 6/2014 | Fritz et al. | |
| 8,955,915 | B2 |   | 2/2015 | Mason et al. | |
| 2008/0168603 | A1 | * | 7/2008 | Ayette | A61G 1/044 |
|||||| 5/628 |
| 2016/0068084 | A1 |   | 3/2016 | Williams et al. | |

FOREIGN PATENT DOCUMENTS

AU 2018201438 A1 9/2018

* cited by examiner

*Primary Examiner* — Mark R Wendell
(74) *Attorney, Agent, or Firm* — Burr & Forman, LLP

(57) ABSTRACT

A child safety seat (1) including a seat base (12) having an upper surface (13) and a lower surface (14) and comprising at least one elongate slot (15) extending through the seat base (12) between the upper surface and the lower surface (13, 14), a crotch strap (20) extending downwardly from a buckle (21) which is above the upper surface (13) of the seat base (12), wherein the crotch strap (20) extends through the at least one elongate slot (15) and has at least one end (22) slidably retained in relation to the seat base (12), and a crotch strap adjustment mechanism (30) configured to act on an intermediate portion of the crotch strap (20), the adjustment mechanism (30) being slidable with respect to the seat base (12) in an oblique direction relative to the direction of elongation of the at least one elongate slot (15) to adjust both the position of the crotch strap (20) exiting the at least one elongate slot (15) and the length of the crotch strap (20) extending above the upper surface (13) of the seat base (12).

9 Claims, 7 Drawing Sheets

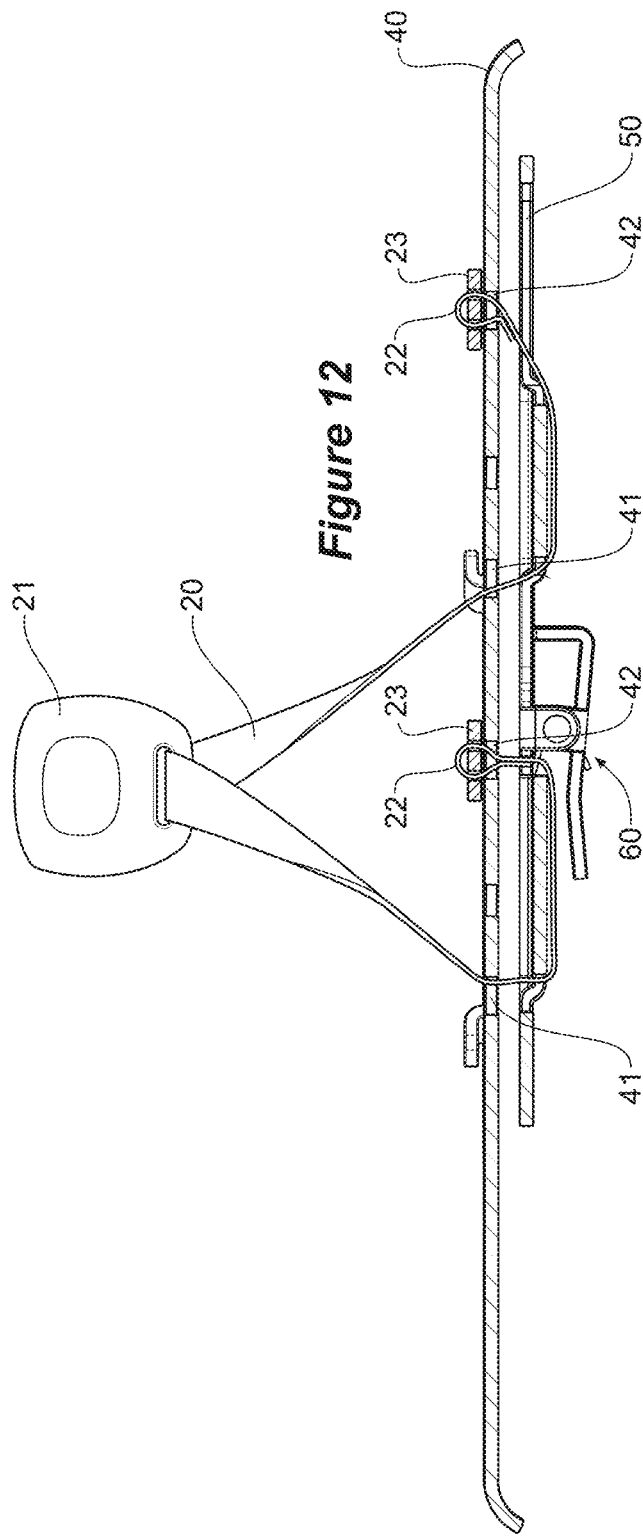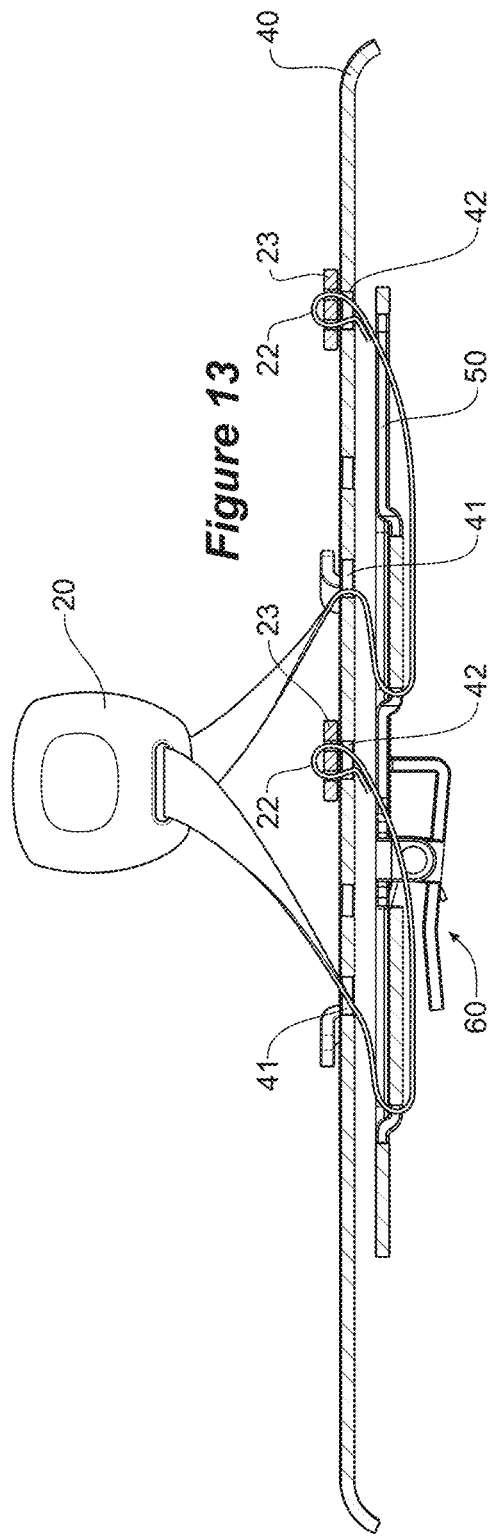

CHILD SAFETY SEAT

CROSS REFERENCE TO RELATED APPLICATIONS

This application claims priority to Australian application no. 2018901125 filed Apr. 5, 2018, the entire contents of which are hereby incorporated by reference it in its entirety.

TECHNICAL FIELD

The present invention relates to a child safety seat.

BACKGROUND

Child safety seats generally comprise a form giving shell comprising a seat portion and a backrest portion, and may be secured with respect to the vehicle and have an independent harness which secures the child with respect to the safety seat.

Child safety seats are generally configured to accommodate children across a range of sizes. Various aspects of a child safety seat may be reconfigurable to accommodate larger or smaller occupants, such as adjustable headrests, seat recline angles and adjustable harness straps.

One part of the harness that must be adjusted for occupant size is the crotch strap. Ideally, the crotch strap will be adjustable for both position and length, such that when the crotch strap is positioned closer to the backrest portion of the seat (to accommodate a smaller occupant) the length of crotch strap extending through the seat portion becomes shorter, conversely when the crotch strap is positioned further from the backrest portion of the seat (to accommodate a larger occupant) the length of the crotch strap extending through the seat portion becomes longer.

A typical crotch strap has a quick release buckle at one end and an attachment means at the other end (such as a bracket, three bar slide, or rod) for attachment to the shell of the safety seat. The crotch strap is threaded through a slot in the shell and the attachment means retains the crotch strap in the event of a crash. The position of the crotch strap is dictated by the position of the slot in the shell, and child safety seats will often have two or more slots to adjust the position of the crotch strap.

In order to adjust the position of the crotch strap, a user is required to detach the attachment from the shell, and rethread the crotch strap through a different slot in the shell. In order to adjust the length of the crotch strap many of these seats require the crotch strap to be threaded through a second slot in the shell. This is a time consuming and fiddly process that can result in incorrect assembly of the crotch strap.

It is against this background, and the problems and difficulties presented therein, that the present invention has been developed.

SUMMARY

According to a first aspect, there is provided a child safety seat including a seat base having an upper surface and a lower surface and comprising at least one elongate slot extending through the seat base between the upper surface and the lower surface, a crotch strap extending downwardly from a buckle which is above the upper surface of the seat base, wherein the crotch strap extends through the at least one elongate slot and has at least one end slidably retained in relation to the seat base, and a crotch strap adjustment mechanism configured to act on an intermediate portion of the crotch strap, the adjustment mechanism being slidable with respect to the seat base in an oblique direction relative to the direction of elongation of the at least one elongate slot to adjust both the position of the crotch strap exiting the at least one elongate slot and the length of the crotch strap extending above the upper surface of the seat base.

The crotch strap may be a single strap or alternatively may be in the form of a dual crotch strap having two sections of webbing extending downwardly from the buckle in a v-configuration, through the at least one elongate slot, and having both ends slidably retained in relation to the seat base.

In the case of a dual crotch strap, the seat base may comprise a pair of elongate slots and wherein the two sections of webbing extend through a respective elongate slot.

The ends of the crotch strap can be slidably retained in relation to the seat base, such that they slide in a direction parallel to the direction of elongation of the elongate slots.

In a further aspect of the invention, the adjustment mechanism is in the form of a crotch strap carriage slidably retained below the lower side of the seat base, and moveable in an oblique direction relative to the direction of elongation of the elongate slot(s).

The crotch strap carriage may comprise at least one slot through which the crotch strap slidably extends.

The seat base may further comprise at least one crotch strap anchor slot, parallel to the at least one elongate slot, and wherein the at least one end of the crotch strap is configured to be slidably retained by the anchor slot.

The crotch strap carriage may be configured to be moveable between a first position and a second position, wherein in the first position, the position of the crotch strap exiting the elongate slot is at a forward most position, and the length of the crotch strap exiting the elongate slot is at its longest, and wherein in the second position, the position of the crotch strap exiting the elongate slot is further rearward than that when the crotch strap carriage is in its first position, and the length of the crotch strap exiting the elongate slot is shorter than that when the crotch strap carriage is in its first position.

By virtue of the crotch strap carriage acting on an intermediate portion of the or each crotch strap, any movement of the crotch strap carriage causes the position of the end of the or each crotch strap(s) where it is slidably retained to change such that it is the same as the position of the crotch strap exiting the corresponding elongate slot.

BRIEF DESCRIPTION OF DRAWINGS

Embodiments of the present invention will be discussed with reference to the accompanying drawings wherein:

FIG. 12 is a sectional view of the crotch strap adjustment mechanism in a first position; and FIG. 13 is a sectional view of the crotch strap adjustment mechanism in a second position.

DESCRIPTION OF EMBODIMENTS

Figure 1:
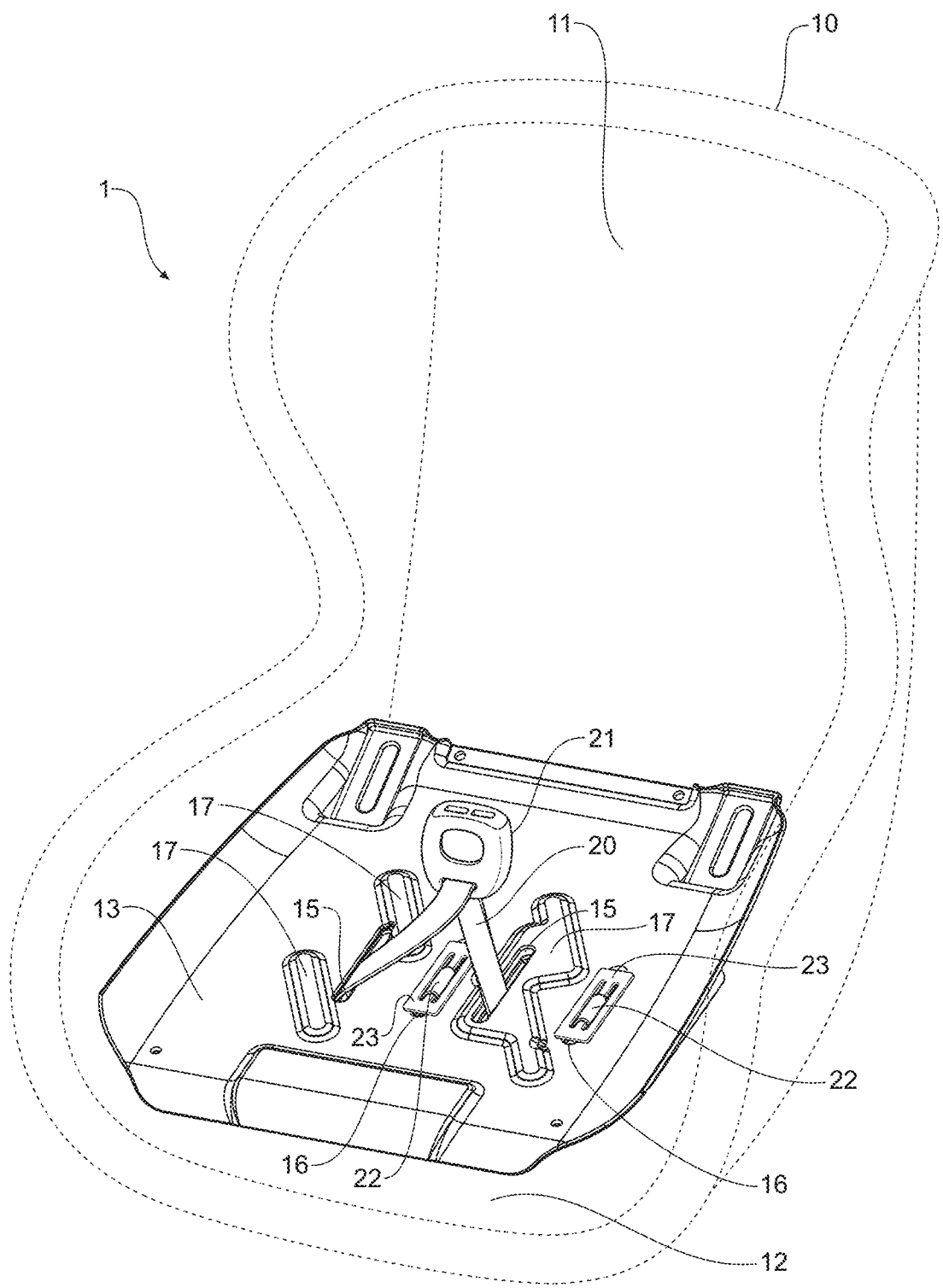
FIG. 1 is a top perspective view of a child safety seat, according to an embodiment.
Figure 2:
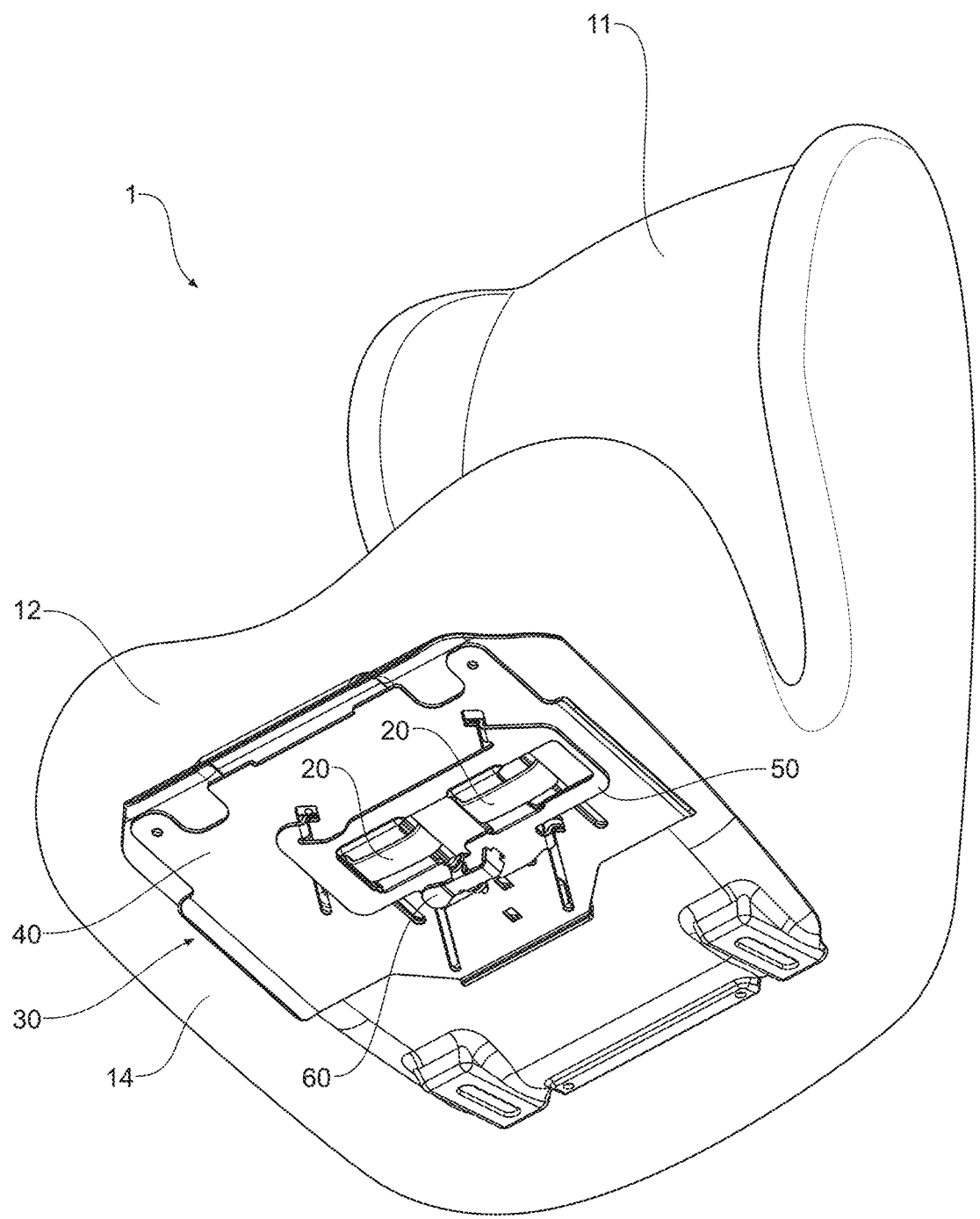
FIG. 2 is a bottom perspective view of the child safety seat of FIG. 1.
Figure 3:
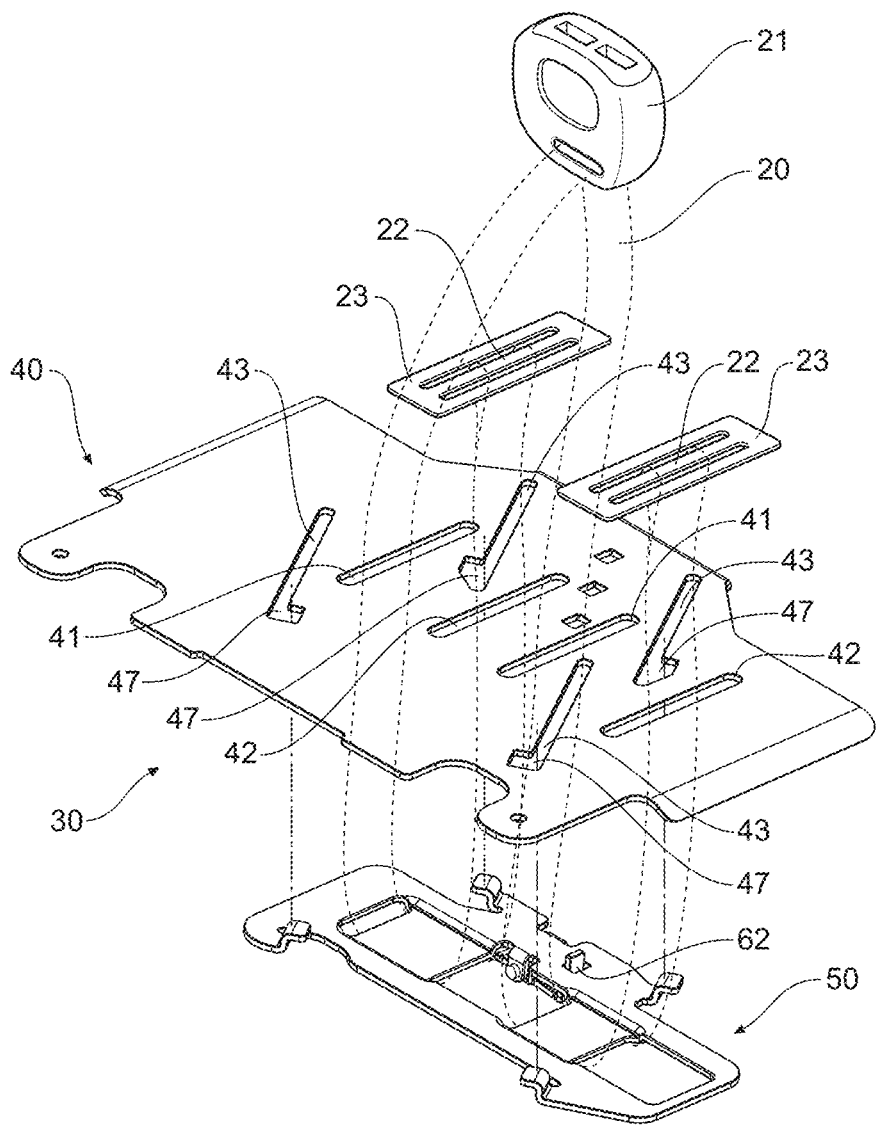
FIG. 3 is an exploded schematic view of the crotch strap adjustment mechanism.
Figure 4:
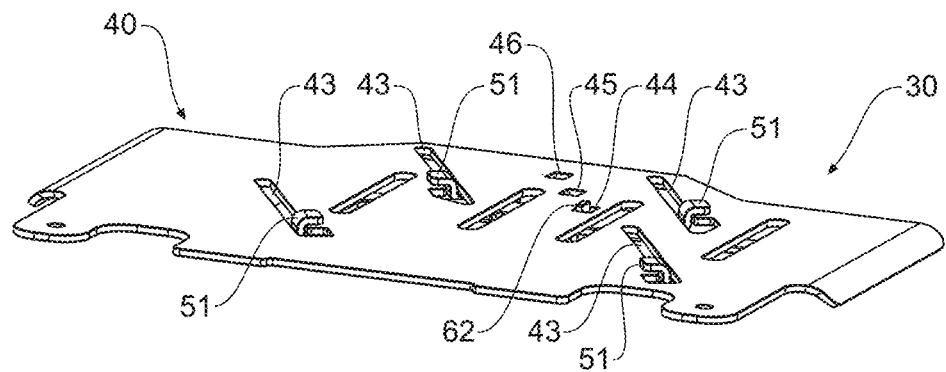
FIG. 4 is a top perspective view of the crotch strap adjustment mechanism.
Figure 5:
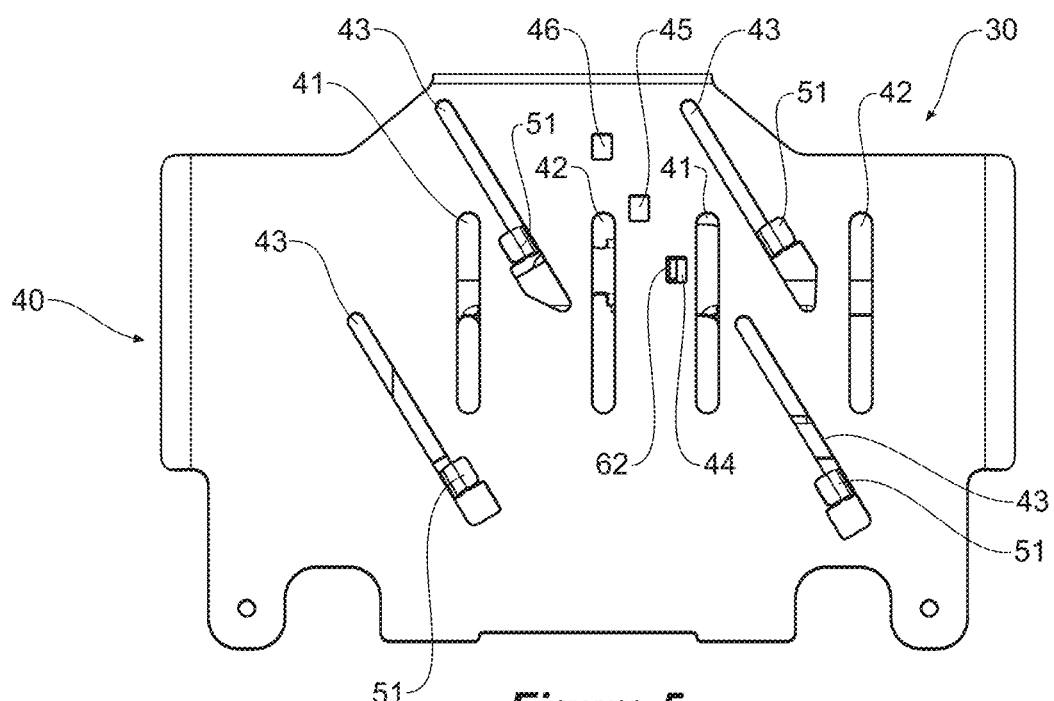
FIG. 5 is a plan view of the crotch strap adjustment mechanism.
Figure 6:
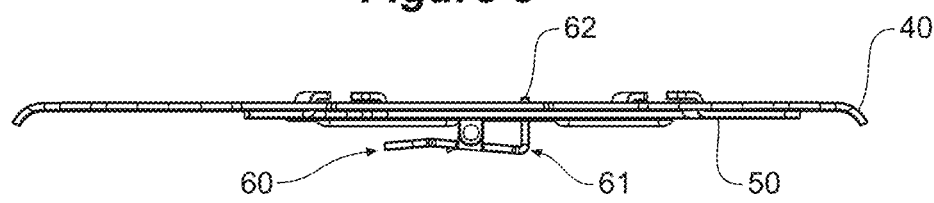
FIG. 6 is a side view of the crotch strap adjustment mechanism.
Figure 7:
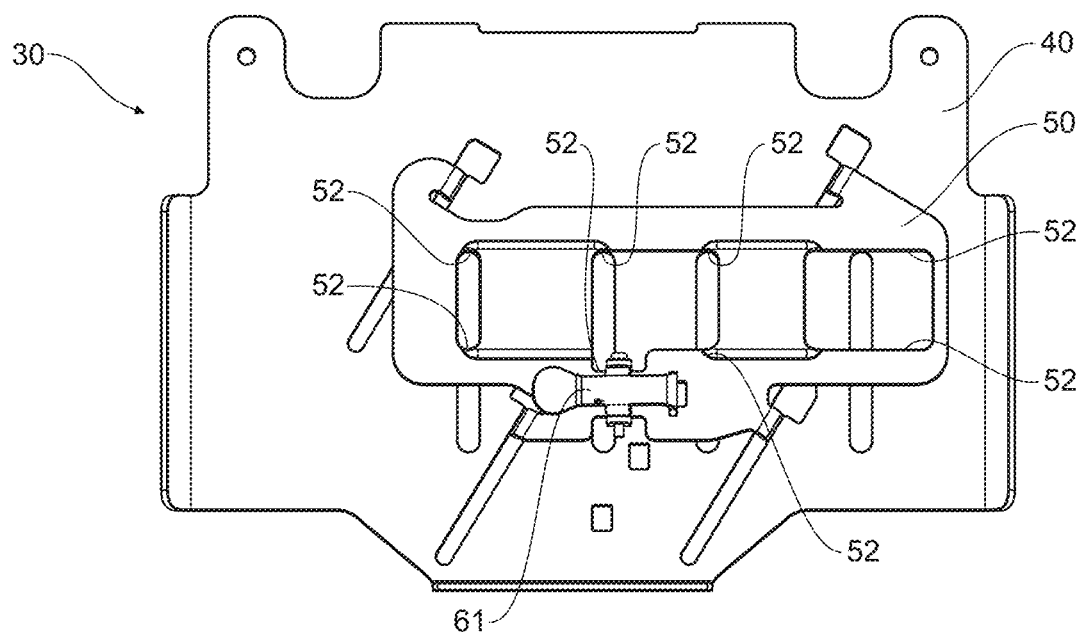
FIG. 7 is a bottom view of the crotch strap adjustment mechanism.

Referring now to FIGS. 1 and 2 where there is shown top and bottom perspective views of a child safety seat 1. The child safety seat 1 includes a seat shell 10 having a backrest section 11 and a seat base 12, the seat base 12 having an upper surface 13 (for supporting an occupant of the seat), a lower surface 14, and a first pair of elongate crotch strap slots 15 extending between the upper and lower surfaces 13, 14, being spaced apart from one another and extending in a longitudinal direction along the seat base 12. The shell 10 may be manufactured from a suitably rigid material such as a thermoplastic polymer (polypropylene for example) where it may be injection moulded.

The child safety seat 1 further comprises a crotch strap 20 which passes through, and extends downwardly from a quick release buckle 21 in a "v" configuration. Each of the ends 22 of the crotch strap 20 extend through the crotch strap slots 15 in the seat base 12 and through a crotch strap adjustment mechanism 30 disposed below the seat base (described in further detail below) before terminating at three bar slides 23 which are slidably retained by a second pair of corresponding crotch strap anchor slots 16, also extending between the upper and lower sides of the seat base of the shell.

While each of the ends of the crotch strap are retained by three bar slides, it will be appreciated that other means for slidably retaining the ends of the crotch strap may also be suitable.

Referring now to FIGS. 3 to 7, where there are again shown perspective views of the crotch strap adjustment mechanism 30, which includes a guide plate 40, strap carriage 50 and locking mechanism 60. Both the guide plate 40 and the strap carriage 50 may be manufactured from a suitably rigid load bearing material (stainless steel for example).

The adjustment mechanism 30 is configured to act on an intermediate portion of the crotch strap 20, and is slidable with respect to the seat base 12 in an oblique direction relative to the direction of elongation of the elongate slots 15 in order to adjust both the position of the crotch strap 20 exiting the elongate slots 15 and the length of the crotch strap 20 extending above the upper surface 13 of the seat base 12.

The guide plate 40 is configured to be fixed to the seat base of the shell, and it can be seen that it features two corresponding crotch strap slots 41 and two corresponding crotch strap anchor slots 42, which, when the guide plate 40 is fixed to the seat base 12 of the shell 10, are coincident with the first and second pairs of slots 15, 16 in the seat base 12 such that the crotch strap 20 also extends through the slots 41, 42 in the guide plate 40.

The guide plate 40 further comprises four parallel carriage guide slots 43 extending at an angle to the crotch strap slots 41, 42. The guide slots 43 are configured to engage four corresponding legs 51 extending from the strap carriage 50, such that the strap carriage 50 is slidably retained below the guide plate 40. It will be appreciated that by virtue of the angle of the guide slots 43 relative to the crotch strap slots 41, 42, that the strap carriage 50 is moveable relative to the guide plate 40 and seat base 12 in a direction that is oblique to (not parallel with) the direction of elongation of the crotch strap slots 41, 42.

In the embodiment shown, the strap carriage 50 is configured to be moveable between three discrete positions by virtue of three discrete positioning apertures 44, 45, 46 located in the guide plate 40 and a releasable locking mechanism 60 in the form of a spring loaded lever 61 having a projection 62 which is biased toward the positioning apertures by a torsion spring (not shown), which in use, prevents movement of the carriage 50 between positions.

Movement of the strap carriage 50 between the three positions is achieved by actuating the lever 61 against the bias of the spring (not shown), such that the projection 62 moves out of the aperture, so that the carriage 50 can slide freely along the guide slots 43. The use of a single locking mechanism 60 enables one-handed operation of the adjustment mechanism 30, and the biasing of the lever 61 toward the apertures ensures positive locking of the strap carriage 50 in each of the positions provided by the positioning apertures 44, 45, 46. While in the embodiment shown, a spring loaded lever 61 is used, it will be appreciated that alternative releasable locking mechanisms may also be employed.

Figure 8:
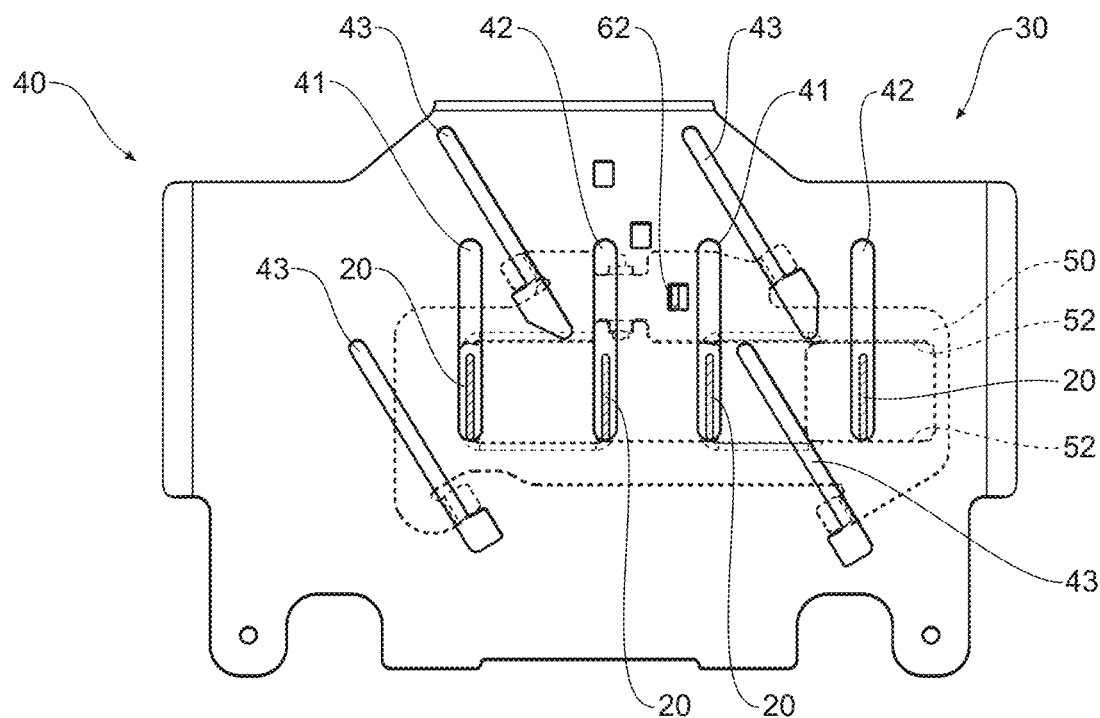
FIG. 8 is a schematic view of the crotch strap adjustment mechanism in a first position.
Figure 10:
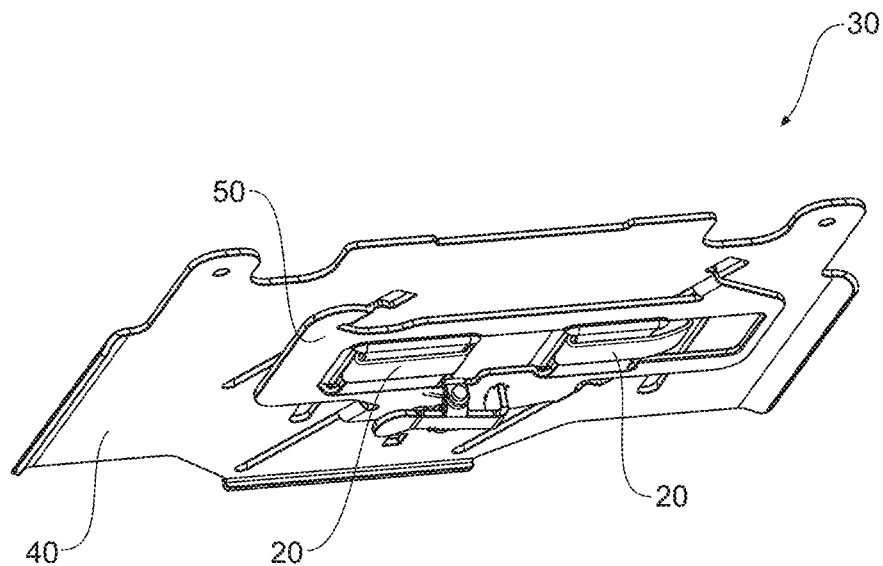
FIG. 10 is a bottom perspective view of the crotch strap adjustment mechanism in a first position.

FIGS. 8, 10 and 12 show the crotch strap adjustment mechanism 30 and crotch strap 20, where the strap carriage 50 is in a first position. It can be seen that the projection 62 on the locking lever 61 is engaged within the first positioning aperture 44, and that the crotch strap 20 exits each of the first pair of crotch strap slots 15 at a position adjacent to the front ends of the slots 15, and that the length of the crotch strap exiting the slots 15 is at its longest, and consequently the height of the buckle 21 relative to the upper surface 13 of the seat base 12 is at its longest.

Figure 9:
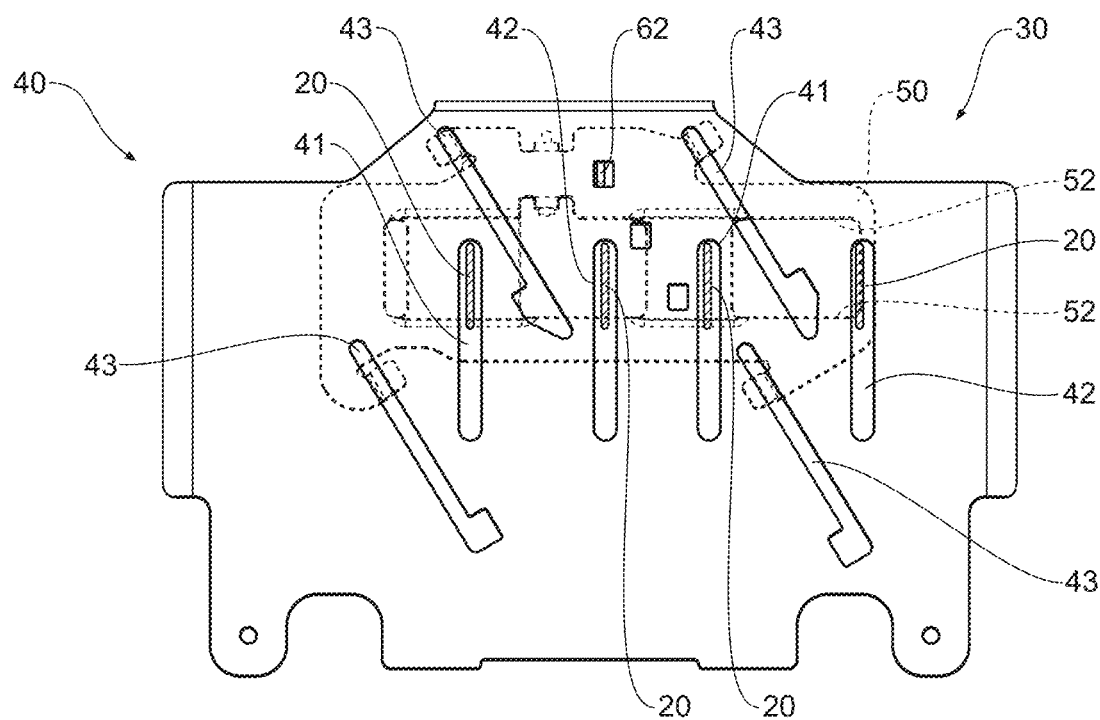
FIG. 9 is a schematic view of the crotch strap adjustment mechanism in a second position.
Figure 11:
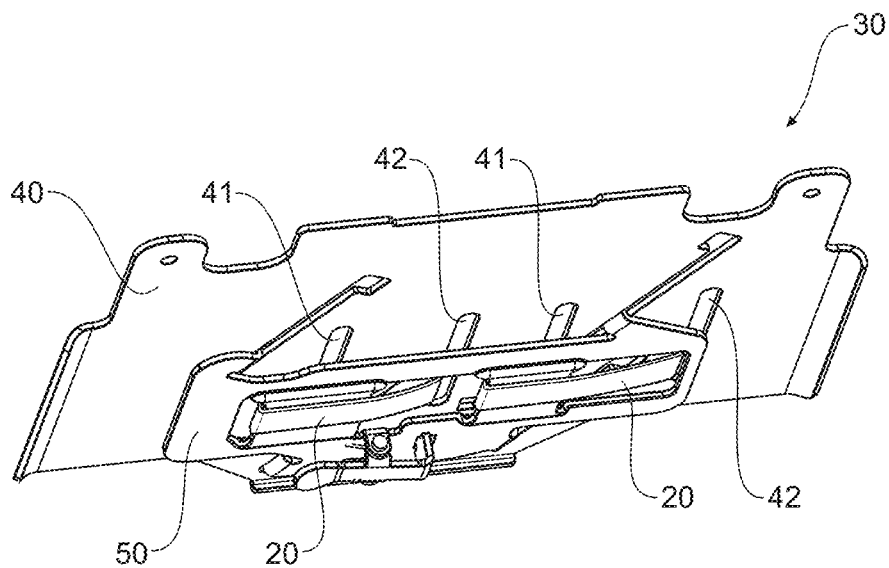
FIG. 11 is a bottom perspective view of the crotch strap adjustment mechanism in a second position.

FIGS. 9, 11 and 13 show the crotch strap adjustment mechanism 30 and crotch strap 20, where the strap carriage is in a second position. It can be seen that the projection 62 on the locking lever 61 is engaged within the third positioning aperture 46, and that the crotch strap 20 exits the first pair of crotch strap slots 15 at a position adjacent to the rear ends of the slots 15, and that the length of the crotch strap exiting the slots 15 is shorter than when the crotch strap carriage is in its first position, and consequently the height of the buckle 21 relative to the upper surface 13 of the seat base 12 is shorter than that when the strap carriage is in a first position.

While not shown, it will be appreciated that the crotch strap carriage may also be moved to an intermediate position, where the projection 62 on the locking lever 61 would be engaged with the second positioning aperture 45. It will be appreciated that the crotch strap 20 would exit each of the first pair of crotch strap slots 15 at a position intermediate the front and rear ends of the slots 15, and that the length of the crotch strap exiting the slots 15 would be intermediate the length of the crotch strap when the crotch strap carriage is in its first and second position, and consequently the height of the buckle 21 relative to the upper surface 13 of the seat base 12 would be intermediate the height of the buckle 21 when the crotch strap carriage is in its first and second position.

The crotch strap adjustment mechanism 30 is configured to adjust both the position and length of the crotch strap 20 (and consequently, the height of the buckle 21) relative to the guide plate 40 and upper side 13 of the seat base 12. For the purpose of the following description, the position and length adjustment will be described in relation to one end of the crotch strap 20. It will however be appreciated that the adjustment mechanism 30 simultaneously acts on both ends of the crotch strap 20.

The strap carriage 50 is adapted to act upon an intermediate portion of the crotch strap 20 in order to adjust both the position of the crotch strap 20 as it exits the crotch strap slot 15 in the seat base 12, and also to adjust the length of the crotch strap available (and height of the buckle 21) above the seat base.

The oblique movement of the strap carriage 50 along the direction of the guide slots 43 is best understood in longitudinal and transverse components, where any longitudinal component of the strap carriage's movement accounts for the adjustment of the position of the crotch strap along the crotch strap slot 41, 15, and any transverse component of the strap carriage's movement accounts for the adjustment of the length of crotch strap (and consequently the height of the buckle) available above the upper side 13 of the seat base 12.

As will be appreciated in FIGS. 8 to 13, as the strap carriage 50 moves along the guide slots 43, it controls the longitudinal position of the end 22 of the strap 20 where it is slidably retained via the three bar slide 23 as well as the longitudinal position of an intermediate portion of the strap 20 where it exits the crotch strap slots 41, 15 and extends away from the upper surface 13 of the seat base 12 of the shell 10. This is achieved by the carriage 50 having transverse edges or surfaces 52 that act against the edges of the strap 20 as the carriage 50 moves, transferring any longitudinal component of the carriage's 50 movement to the strap 20. This ensures that the end 22 of the strap and the position of the strap 20 where it exits the crotch strap slots 41, 15 is transversely aligned, ensuring that the length of crotch strap carried below the seat base 12 remains flat, so as to avoid twisting.

As will also be appreciated in FIGS. 8 to 13, as the strap carriage 50 moves along the guide slots 43, it also controls the amount of crotch strap 20 available above the upper surface 13 of the seat base 12, and consequently the height of the buckle 21 relative to the upper surface 13. As the transverse distance between the carriage 50 and the anchor slots 42, 16 increases (carriage 50 moving away from the anchor slots 42, 16) the path that the strap 20 takes before it exits the crotch strap slots 41, 15 is increased, such that the amount of strap 20 available above the upper surface 13 of the seat base 12 decreases. Conversely, as the transverse distance between the carriage 50 and the anchor slots 42, 16 decreases (carriage 50 moves toward the anchor slots 42, 16) the path that the strap 20 has to take before it exits the crotch strap slots 41, 15 is decreased, such that the amount of strap 20 available above the upper surface 13 of the seat base 12 increases.

It will further be appreciated that by changing the angle that the carriage 50 moves relative to the slots 15 in the seat base 12, it is possible to change the sensitivity of the crotch strap length adjustment for a given longitudinal component of movement of the carriage 50. In other words, a larger increasing angle results in a larger change to the amount of strap 20 available (and height of the buckle 21) above the upper surface 13 of the seat base 12 of the seat shell 10 for a set longitudinal component of movement, and a smaller angle results in a smaller change to the amount of strap 20 available (and height of the buckle 21) above the upper surface 13 of the seat base 12.

As shown in FIG. 1, the seat base 12 may also include raised sections 17 which are positioned above the carriage guide slots 43, which are configured to allow the legs 51 extending from the strap carriage 50 to move freely along the carriage guide slots 43 without interference (such as from the occupant of the seat or on any trim and/or padding (not shown) that may be disposed over the shell).

The child safety seat 1 may be assembled using the following method.

The guide plate 40 is secured to the lower surface 14 of the seat base 12, such that the slots 41, 42 in the guide plate 40 and the corresponding slots 15, 16 in the seat base 12 of the shell 10 are aligned. The strap carriage 50 and locking mechanism 60 are then secured to the guide plate 40 by inserting the carriage legs 51 through the enlarged openings 47 in the guide slots 43, and then sliding the carriage 50 along the guide slots 43 until the locking mechanism 60 engages with the first locking aperture 44 in the guide plate 40. The crotch strap 20 is then installed by pushing the three bar slides 23 attached to the ends 22 of the belt 20 down through the first pair of crotch strap slots 15 in the seat base 12 and the slots 41 in the guide plate 40 and the strap carriage 50 then up through the second pair of crotch strap anchor slots 42 in the guide plate 40 and the slots 16 in the seat base 12, where the three bar slides 23 are then positioned such that they are slidably retained by the upper surface 13 of the seat base 12 surrounding the anchor slots 16.

While in the embodiment shown, the strap carriage 50 is slidably retained by the seat 1 via guide slots 43 in the guide plate 40 and legs 51 extending from the strap carriage 50, it will be appreciated that in alternative embodiments, any means for allowing the strap carriage to be slidably retained by the seat may be employed.

While in the embodiment shown, the child safety seat 1 features a guide plate 40 secured to the lower surface 14 of the seat base 12, it will be appreciated that in alternative embodiments, the seat base may instead be configured to slidably retain the strap carriage and provide locking apertures for the locking mechanism, without the need for a separate guide plate.

While in the embodiment shown, the strap carriage 50 controls the length of both ends of the crotch strap 20, it will be appreciated that in an alternative embodiment, the strap carriage may instead be configured to only adjust the length of one end of the crotch straps.

While in the embodiment shown, the crotch strap 20 has a v-configuration having two sections of webbing extending downwardly from the buckle in a v-configuration (where the adjustment mechanism is configured to act on an intermediate portion of both sections of webbing), it will be appreciated that in an alternative embodiment, the crotch strap may consist of a single section of webbing extending downwardly from the buckle, where the adjustment mechanism is configured to act on the single section of webbing.

It will be appreciated that in a further embodiment, the ends of the crotch strap may instead terminate in three bar slots which are rigidly connected to the strap carriage, and the strap carriage features a pair of crotch strap slots through which the ends of the crotch strap extend through before extending through the crotch strap slots in the guide plate and seat base of the shell. It will be appreciated that the control of the position and length of the crotch strap is still achieved through movement of the strap carriage along the guide slots in the guide plate in an oblique direction relative to the crotch strap slots.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A child safety seat including:
   a seat base having an upper surface and a lower surface and comprising at least one elongate slot extending through the seat base between the upper surface and the lower surface;
   a crotch strap extending downwardly from a buckle which is above the upper surface of the seat base, wherein the crotch strap extends through the at least one elongate slot and has at least one end slidably retained in relation to the seat base; and
   a crotch strap adjustment mechanism configured to act on an intermediate portion of the crotch strap, the crotch strap adjustment mechanism being slidable with respect to the seat base in an oblique direction relative to the direction of elongation of the at least one elongate slot to adjust both the position of the crotch strap exiting the at least one elongate slot and the length of the crotch strap extending above the upper surface of the seat base.

2. The child safety seat as claimed in claim 1, wherein the crotch strap is in the form of a dual crotch strap having two sections of webbing extending downwardly from the buckle in a v-configuration, through the at least one elongate slot, and having both ends slidably retained in relation to the seat base.

3. The child safety seat as claimed in claim 2, wherein the seat base comprises a pair of elongate slots and wherein the two sections of webbing extend through a respective elongate slot.

4. The child safety seat as claimed in claim 3, wherein the ends of the crotch strap are slidably retained in relation to the seat base, such that they slide in a direction parallel to the direction of elongation of the elongate slots.

5. The child safety seat as claimed in claim 1, wherein the adjustment mechanism is in the form of a crotch strap carriage slidably retained below the lower side of the seat base, and moveable in an oblique direction relative to the direction of elongation of the at least one elongate slot.

6. The child safety seat as claimed in claim 5, wherein the crotch strap carriage comprises at least one slot through which the crotch strap slidably extends.

7. The child safety seat as claimed in claim 6, wherein by virtue of the crotch strap carriage acting on an intermediate portion of the or each crotch strap, any movement of the crotch strap carriage causes the position of the end of the or each crotch strap(s) where it is slidably retained to change such that it is the same as the position of the crotch strap exiting the corresponding elongate slot.

8. The child safety seat as claimed in claim 5, wherein the crotch strap carriage is configured to be moveable between a first position and a second position;
   wherein, in the first position, the position of the crotch strap exiting the elongate slot is at a forward most position, and the length of the crotch strap exiting the elongate slot is at its longest; and
   wherein, in the second position, the position of the crotch strap exiting the elongate slot is further rearward than that when the crotch strap carriage is in its first position, and the length of the crotch strap exiting the elongate slot is shorter than that when the crotch strap carriage is in its first position.

9. A child safety seat including:
   a seat base having an upper surface and a lower surface and comprising at least one elongate slot extending through the seat base between the upper surface and the lower surface;
   a crotch strap extending downwardly from a buckle which is above the upper surface of the seat base, wherein the crotch strap extends through the at least one elongate slot and has at least one end slidably retained in relation to the seat base; and
   a crotch strap adjustment mechanism configured to act on an intermediate portion of the crotch strap, the crotch strap adjustment mechanism being slidable with respect to the seat base in an oblique direction relative to the direction of elongation of the at least one elongate slot to adjust both the position of the crotch strap exiting the at least one elongate slot and the length of the crotch strap extending above the upper surface of the seat base;
   wherein the seat base further comprises at least one crotch strap anchor slot, parallel to the at least one elongate slot, and wherein the at least one end of the crotch strap is configured to be slidably retained by the anchor slot.

* * * * *